May 19, 1925.  
O. B. MUELLER  
1,538,346  
VALVE MEMBER AND METHOD OF FORMING SAME  
Filed Jan. 18, 1921   2 Sheets-Sheet 2
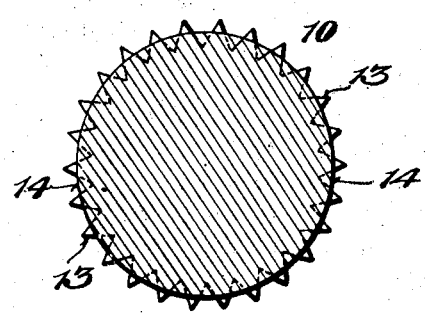
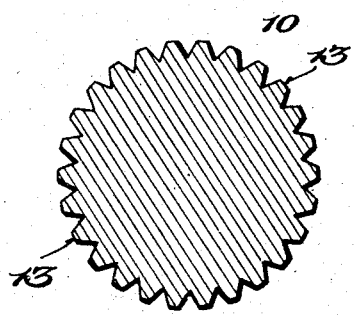
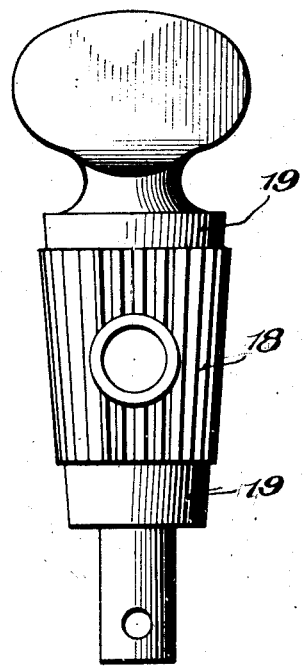
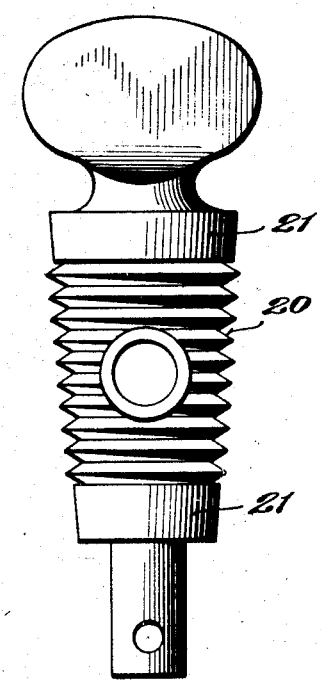
Inventor  
Oscar B. Mueller,  
By Cushman, Bryant & Darby  
Attorneys Patented May 19, 1925.

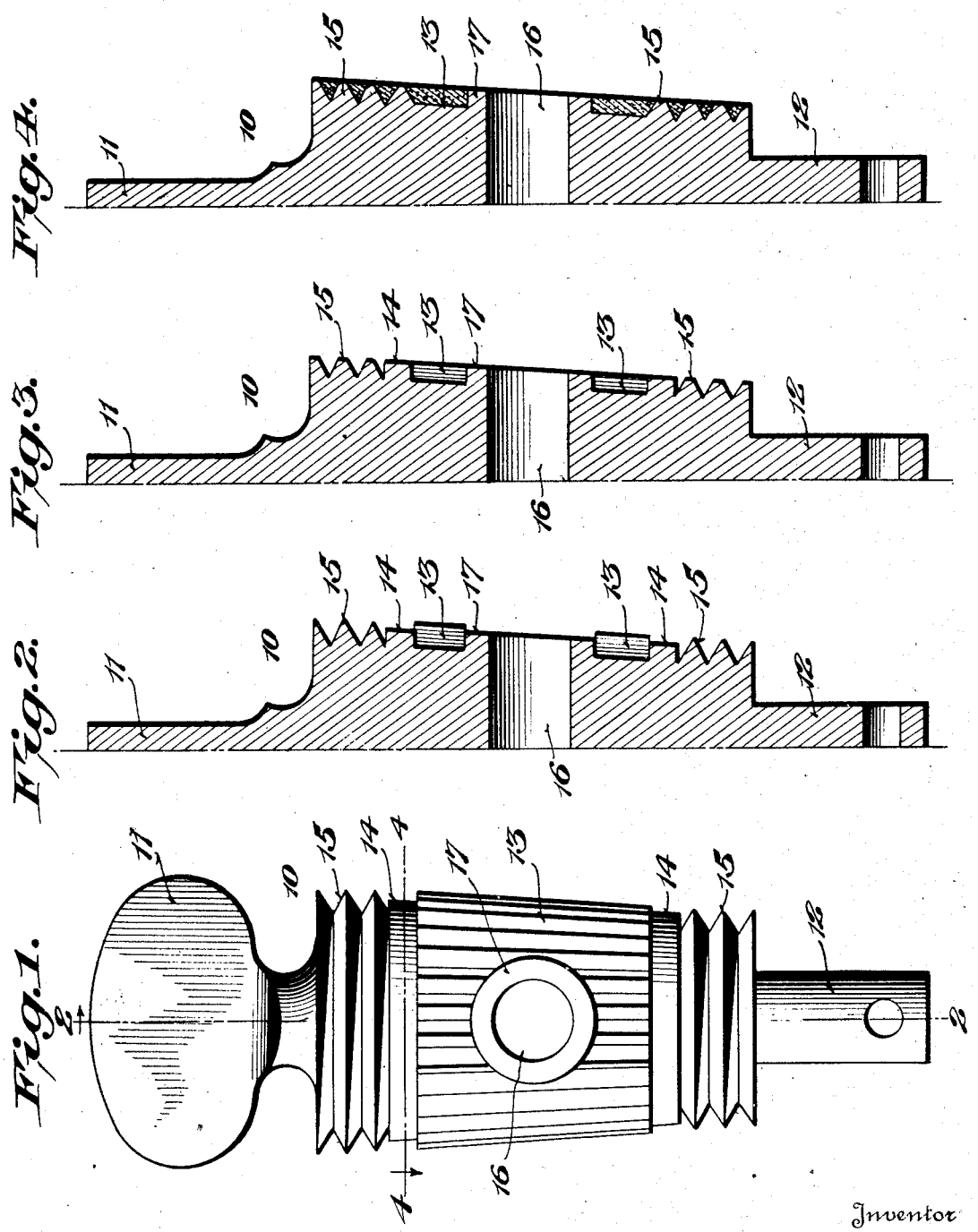

1,538,346

UNITED STATES PATENT OFFICE.

OSCAR B. MUELLER, OF PORT HURON, MICHIGAN, ASSIGNOR TO ADOLPH MUELLER, TRUSTEE, OF DECATUR, ILLINOIS.

VALVE MEMBER AND METHOD OF FORMING SAME.

Application filed January 18, 1921. Serial No. 438,209.

*To all whom it may concern:*

Be it known that I, OSCAR B. MUELLER, a citizen of the United States, residing at Port Huron, in the county of St. Clair and State of Michigan, have invented new and useful Improvements in Valve Members and Methods of Forming Same, of which the following is a specification.

The present invention relates generally to valves and valve parts and methods of forming the same, and, as here shown, is applied to cocks of the rotary plug key type.

It will be understood that this disclosure is illustrative only, and that the invention may be applied to valves of other types, and still be within the range of my invention.

The object of the invention is to provide a valve or cock, following the novel methods which I have invented, the members of which are so constructed as that the cock may be produced at a minimum cost and a fluid tight fit of the parts secured, so as to produce a non-leaking cock at much less cost, due to the reduction in the labor item, than is now possible.

Under present methods of making cocks and faucets, it is the custom to make the parts, generally by sand casting, then machine the rotatable or movable contacting surfaces, and finally grind these surfaces (valve seat and key) together in the presence of a suitable abrasive, so as to true and bring the surfaces into intimate contact and give a fluid tight construction. This method of grinding keys to cocks is costly; the output is small; and the percentage of defectives due to inaccurate grinding is considerable, for, even though great care in practicing the present methods utilizing the present apparatus is exercised, some of the ground surfaces will develop high and low spots which, under test, result in leaks. These high and low spots and, furthermore, flattened places are usually caused by imperfect metal mixtures used in forming the valve parts, the formed metal developing soft spots on the contact face of the valve member.

I accomplish the object aimed at by providing one of the contacting valve surfaces, preferably the key, (although the valve seat may be made according to my invention and the key left smooth) with a plurality of contact surfaces so disposed as that there are a multiplicity of leak preventing contacts between the two members, any one of which would be sufficient to take care of fluid pressures and prevent leakage, but the multiplicity of which effectually guards against any leakage between the valve parts.

In order that the invention may be understood by those skilled in the art, I have shown in the drawings herewith one embodiment of it.

In said drawings:

Fig. 1 is a view in elevation of an unfinished key constructed in accordance with my invention.

Fig. 2 is a sectional view of a portion of the key shown in Fig. 1, showing the key surface before finishing.

Fig. 3 is a view in section of a portion of the key showing the key surface after finishing.

Fig. 4 is a view in section of a portion of a key of slightly different formation from that shown in the preceding figures.

Fig. 5 is a view substantially on the line 4—4 of Fig. 1.

Fig. 6 is a view similar to Fig. 4, showing the key after finishing.

Fig. 7 is a view in side elevation of another form of my invention.

Fig. 8 is a view in side elevation of a further modification in an unfinished form.

Referring to the drawings by numbers, like numbers being used in the several views, and considering first the disclosure in Figs. 1, 2 and 3, 10 designates a key for cocks of the general type known as "rotary plugs" now in common use and provided with the usual body portion; the handle portion 11, and tail piece 12.

It will be understood that the type of key shown is utilized as illustrating simply one form of valve member to which the invention is applied, but that the invention is susceptible of application to other types of valves and other valve members.

The body portion of the key as herein shown is provided with a plurality of contact surfaces, which, in the form shown in Figs. 1, 2 and 3, comprise the longitudinal ridges 13, of saw tooth formation in cross section as here shown, although the cross-sectional form may be varied, so that a multiplicity of separated line contact surfaces are provided. In the form shown in Figs. 1, 2 and 3 the contact points 13 stop short of each end of the body portion, where they meet substantially circumferential cylindrical surfaces 14, which annular surfaces define the diameter of the key when finished, the ridges 13, prior to the finishing operation, projecting slightly beyond the surfaces 14, as will appear from Figs. 1 and 2.

In the development shown in Fig. 1, the ends of the body portion beyond the plain surfaces 14 will be provided with a multiplicity of substantially horizontally disposed separated ridges 15 of saw tooth formation, as here shown, these ridges projecting slightly beyond the plain surfaces 14 before finishing, and providing a multiplicity of line contacts annularly disposed about the body.

The opening 16 through the key will preferably have a smooth marginal surface 17 lying in the same plane, as shown in Figs. 1, 2 and 3, with the surfaces 14.

The key as thus described may be formed in any approved or desired manner, but preferably, because of the low cost; ease of manufacture, and uniformity of production, I make the key, or other valve member to which my invention is applied, by die casting; this method lending itself very readily to quantity production at low cost, and such die casting will be performed in any suitable die casting machines rigged and patterned to handle and cast the particular valve member desired.

The key 10, when turned out of the die casting apparatus, will be of the formation shown in Figs. 1 and 2, wherein the plurality of line contact points 13 and 15 project slightly beyond the plain surfaces 14, as most clearly shown in Fig. 2.

The advantage of die casting is, that the line contacts or ridges on the body of the key will be perfectly formed and the necessity of machine work on and grinding of the key or other valve part to give it a properly fitted surface is eliminated.

In this condition, the key will be subjected to a finishing operation to bring the projecting ridges or line contact surfaces 13 and 15 to the level of the plain surfaces 14, and this finishing operation, while it may be performed in different ways, is very conveniently and quickly performed by burnishing down the ridges at their tops with suitable tools, so as to give a uniform finish to the edges of the ridges both longitudinally and annularly. This operation flattens slightly the saw tooth edges and closes in to some extent the grooves between the saw teeth without completely closing them. As will be apparent from Figs. 3 and 5, this finishing or burnishing down of the ridges 13 and 15 to the level of the plain surfaces 14, will result in closing the ends of the longitudinal grooves between the ridges 13, the plain surfaces 14 damming the ends of the channels. A key thus formed provides a multiplicity of contact points with non-communicating channels between them, so that any leakage about the valve part will be localized and if it should so happen that fluid should pass one ridge it would be stopped effectually by the succeeding ridges or line contacts, and could not circulate around the body of the valve; and pressure could not force it out at the ends of the key for the reason that the longitudinal grooves are closed by the plain surfaces at their ends, and, furthermore, the annular ridges at the ends of the key body provide a multiplicity of intercepting contacts which will localize any seepage and prevent escape of fluid at the end of the key.

While the key thus formed will effectually prevent leakage, I propose to increase its effectiveness by loading the channels or grooves between the ridges with any suitable water repellent filler, as a heavy grease, (see Fig. 4) which, by reason of the small area of the channels in the finished key, will be retained therein indefinitely and serve not only to lubricate the key but add to its fluid stopping efficiency.

An obvious variation of the form shown in Figs. 1 to 3, inclusive, is illustrated in Fig. 4, in which the plain surfaces 14 (see Fig. 1) between the ridged and grooved surfaces are dispensed with, and the longitudinal ridges end at the horizontally ridged sections, this form of the invention having been found to be feasible.

In that form of the invention shown in Fig. 7 the steps of die casting and finishing will be the same as heretofore described, but the formation is slightly different in that I have dispensed with the annular ridges at the ends of the key and provide simply the longitudinal ridges 15 and the plain cylindrical surfaces 19 at the ends of the key, the ridges 18, as shown in Fig. 7, which illustrates the key after the die casting and finishing operations, projecting slightly beyond the surfaces 19, it being intended, as heretofore described, to burnish down the ridges 18 to the level of the plain surfaces 19 at the ends of the key.

In that form of the invention shown in Fig. 8, a construction is disclosed in which the ridges 20 are of annular formation, as distinguished from the longitudinal ridges heretofore described, these annular ridges projecting slightly beyond the plain surfaces 21 at the ends of the key, such projecting edges being brought down in the finishing operation to the level of the plain end surfaces 21. The finished form is not illustrated.

It will be seen that with the form shown in Fig. 8 with the annular ridges; or the form shown in Fig. 7 with the longitudinal ridges, or the form shown in Figs. 1, 2, 3 and 4, in which the longitudinal and annular ridges are combined, a plurality of substantially line contacts are provided, with intermediate channels, which, as stated, may be filled with heavy grease so that seepage past all of these contacts is impossible, and a tight, easily operated key provided. It will be obvious that with this construction, the contact area between the parts, while sufficient to prevent leakage, is considerably reduced, so that an easily turned key is provided. This reduced contact area permits the key or the valve parts to be forced together much more tightly than would be possible with the ordinary valve parts having continuous contact, for the ordinary ground key will, if too tightly set in its seat, bind and prevent turning.

The valve parts may be formed of any suitable metal, and may be made of the same mixture or of different mixtures having different degrees of hardness. For example, if desired, the key, having the formations described, may be made of a softer metal than the body, and in event of the formations being made upon the body portion of the valve instead of upon the key, that body or its contact wall may be formed of softer metal.

The great value of the development is the ease with which it may be produced, and the low cost of production without any impairment of efficiency. The valve parts may be very quickly and very accurately die cast. No finishing operations are necessary to finish the exterior surface of the key except the burnishing down, or equivalent operation, to finish and flatten the points of the ridges and bring them to a uniform and proper level.

I have shown this development as applied to the key member of a valve or cock, and such key is designed to be seated in a suitable valve seat. It will be obvious, however, that the construction might be reversed and that the ridges or line contacts could be formed on the surface of the valve seat, burnished down by suitable tools, and a plain key used in such seat with the same results hereinbefore described. Furthermore, while I have shown specific arrangements of alternating ridges and grooves, it is to be understood that the direction and formation of these alternating projections and depressions may be varied from the specific forms here shown. I do not, therefore, limit my invention in its application to the key member or to a valve member of any particular type, although for practical purposes and according to my present experiments, the key seems to be the preferable valve member to which to apply the invention.

Such changes as are within the skill of the mechanic and such departures as involve obvious variations in structure and design may be made from the disclosure herein and still be within the range of my invention.

I claim:—

1. A valve member having a wall formed with a multiplicity of alternating ridges and grooves extending longitudinally of the member, and a multiplicity of substantially horizontal alternating ridges and grooves beyond both ends of the longitudinal ridges and grooves, the tops of all said ridges being flattened to provide an appreciable contact area.

2. A valve member having a wall, one portion of which is made up of a multiplicity of alternating ridges and grooves, and another portion of which is made up of alternating ridges and grooves disposed at an angle to those of said first named section, the tops of all of the ridges being flattened and providing the contact area of the valve member.

3. A valve member having a wall one portion of which is made up of a multiplicity of substantially longitudinal alternating ridges and grooves, and another portion of which is made up of a multiplicity of substantially horizontal alternating ridges and grooves, the grooves being substantially V-shape in cross section and the tops of the ridges being flattened to provide the contact area of the valve member.

4. A valve member having a section of its wall made up of a multiplicity of substantially longitudinal alternating ridges and grooves, and other sections of its wall made up, respectively, of a multiplicity of substantially horizontal alternating ridges, grooves and plain circumferentially extending surfaces, the tops of said ridges having the same contour as the circumferentially extending plain surfaces.

5. A valve member having a section of wall made up of a multiplicity of substantially longitudinal alternating ridges and grooves, and another section of its wall made up of a multiplicity of substantially horizontal alternating ridges and grooves, the tops of said ridges having the same contour and being flattened to give an appreciable contact area.

6. A valve member having a wall, one portion of which is made up of a multiplicity of substantially longitudinal alternating ridges and grooves, and another portion of which is made up of a multiplicity of substantially horizontal alternating ridges and grooves, and a circumferentially disposed plain surface between said longitudinal and horizontal ridged and grooved portions, the tops of the ridges of said ridged and grooved portions having the contour of said plain surface.

7. A valve member having a wall, one portion of which is formed by a multiplicity of substantially longitudinal alternating ridges and grooves, portions of the wall beyond both ends of said longitudinal ridges and grooves including a multiplicity of substantially horizontal alternating ridges and grooves, the horizontal and longitudinal grooved portions being separated by circumferentially extending plain surfaces and the tops of all of the ridges having the same contour as said circumferential surfaces.

8. A valve member having a wall, one portion of which is made up of a multiplicity of substantially longitudinal alternating ridges and grooves, the wall beyond both ends of the longitudinal ridges and grooves being formed with a multiplicity of substantially horizontal alternating ridges and grooves, said grooves being substantially V-shape in cross section and the tops of all of the ridges being flattened, for the purpose described.

9. A key for cocks having a section of its wall provided with a multiplicity of substantially longitudinal alternating ridges and grooves, and another section of its wall provided with a multiplicity of substantially horizontal alternating ridges and grooves, the longitudinal and horizontal ridges being flattened at their tops to give them the same contour and provide an appreciable contact area.

10. A key for cocks having a section of its wall provided with a multiplicity of substantially longitudinal alternating ridges and grooves, a multiplicity of substantially horizontal alternating ridges and grooves extending over another portion of its wall, and a substantially circumferential plain surface extending over another portion of its contacting surface, the tops of said longitudinal and horizontal ridges being flattened to give an appreciable contact area having the same contour as said plain surface.

11. A key for cocks having a section of its wall provided with a multiplicity of substantially longitudinal alternating ridges and grooves, a multiplicity of substantially horizontal alternating ridges and grooves extending over another portion of its wall, and a substantially circumferential plain surface between said longitudinally and horizontally ridged and grooved sections, the ridges of said ridged and grooved sections being flattened to give an appreciable contact area and having the same contour as said plain surface.

12. A key for cocks having the middle section of its body ridged and grooved, substantially circumferential plain portions at each end of said ridged and grooved section, and a ridged and grooved section adjacent a plain portion with ridges and grooves disposed at an angle to those of said first named section, the ridges of both sections being flattened to give an appreciable contact area having the contour of said plain section.

13. A key for cocks having the middle section of its body provided with substantially longitudinal alternating ridges and grooves, an opening through said body portion having a plain marginal surface, substantially circumferential plain surfaces at each end of said ridged and grooved section, and substantially horizontal alternating ridges and grooves adjacent each plain surface, the ridges of said ridged and grooved sections being flattened to give an appreciable contact area having the same contour as said plain surface.

14. The method of forming valve parts which consists in grooving the wall of such part to provide a multiplicity of V-shaped contact ridges, and then flattening the ridges to provide an appreciable contact area.

15. The method of forming valve parts which consists in die casting such part with alternating ridges and grooves on its wall, and thereafter burnishing down the tops of the ridges to give an appreciable contact surface.

16. The method of forming valve parts which consists in die casting such part with a ridged, grooved and a plain wall section, and thereafter flattening down the tops of the ridges to conform to the contour of said plain section.

17. The method of forming valve parts which consists in die casting the part with sections ridged and grooved in different directions and with plain sections, with the ridges projecting beyond such plain sections, and thereafter flattening down the tops of the ridges to conform to the contour of said plain sections.

18. The method of forming valve parts which consists in die casting the part with alternating ridged, grooved and plain sections with the ridges projecting beyond said plain sections, and thereafter flattening down the ridges to conform to the contour of said plain sections.

19. The method of forming keys for cocks which consists in die casting the key with longitudinally disposed ridges and grooves and horizontally disposed ridges, grooves and plain sections between said longitudinally and horizontally ridged and grooved sections, boring an opening through said key, removing portions of the ridges about said opening to form a plain marginal surface, and finally flattening down the ridges of both ridged sections to conform to the contour of said plain surfaces.

20. The method of forming keys for cocks which consists in die casting the key with longitudinally disposed ridges and grooves and horizontally disposed ridges, grooves and plain sections between said longitudinally and horizontally ridged and grooved sections, boring an opening through said key, reaming off the ends of the ridges adjacent said opening to form a plain marginal surface, flattening down the ridges of both ridged sections to conform to the contour of said plain surfaces, and filling the grooves with a water repellent filler.

21. A valve member having a multiplicity of alternating, vertically disposed, contact surfaces and grooves extending longitudinally thereof, and a multiplicity of alternating, horizontally disposed, contact surfaces and grooves at each end of the member; the contact surfaces being of appreciable area to insure proper contact with an opposed member, and the grooves being of sufficient capacity to retain a lubricant.

22. A valve member having a multiplicity of alternating, vertically disposed, contact surfaces and grooves extending longitudinally thereof, and a multiplicity of alternating, horizontally disposed, contact surfaces and grooves at each end of the member spaced from the ends of said vertical contact surfaces and grooves; the contact surfaces being of appreciable area to insure proper contact with an opposed member, and the grooves being of sufficient capacity to retain a lubricant.

In testimony whereof I have hereunto set my hand.

OSCAR B. MUELLER.